(12) United States Patent
Lammers (10) Patent No.: US 9,514,660 B2
(45) Date of Patent: Dec. 6, 2016

(54) METHOD AND ARCHITECTURE FOR DISTRIBUTED MULTI-ECHELON EXERCISE AND TRAINING SYSTEM AND METHOD OF USING THE SAME

(75) Inventor: Gary J. Lammers, Colorado Springs, CO (US)

(73) Assignee: The Boeing Company, Chicago, IL (US)

(*) Notice: Subject to any disclaimer, the term of this patent is extended or adjusted under 35 U.S.C. 154(b) by 1203 days.

(21) Appl. No.: 11/410,761

(22) Filed: Apr. 25, 2006

(65) Prior Publication Data

US 2006/0252024 A1 Nov. 9, 2006

Related U.S. Application Data

(60) Provisional application No. 60/678,666, filed on May 6, 2005.

(51) Int. Cl.
*G09B 9/00* (2006.01)
*G09B 25/08* (2006.01)

(52) U.S. Cl.
CPC ................................ *G09B 25/08* (2013.01)

(58) Field of Classification Search
USPC ............................................. 434/365–366
See application file for complete search history.

(56) References Cited

U.S. PATENT DOCUMENTS

| 4,424,038 | A  | * | 1/1984 | Tingleff et al. ............... 434/2 |
| 4,623,312 | A  | * | 11/1986 | Crawford ..................... 434/224 |
| 6,128,655 | A  | * | 10/2000 | Fields et al. ................. 709/219 |
| 6,739,877 | B2 | * | 5/2004 | Bailey et al. ................. 434/262 |
| 6,918,771 | B2 | * | 7/2005 | Arington et al. ............. 434/262 |
| 2003/0110379 | A1 | * | 6/2003 | Ylonen et al. ............... 713/164 |
| 2005/0204054 | A1 |  | 9/2005 | Wang et al. |
| 2006/0004862 | A1 | * | 1/2006 | Fisher et al. ............... 707/104.1 |

* cited by examiner

*Primary Examiner* — Sam Yao
*Assistant Examiner* — Evan Page
(74) *Attorney, Agent, or Firm* — Haynes and Boone, LLP

(57) ABSTRACT

A training apparatus includes a server and a controller. The server is configured to send and receive messages on at least one network, to receive messages at a plurality of publisher ports, and to send messages to a plurality of subscriber ports. The controller operates the server sends a first message to a training system destination that is initially configured to receive messages on a first port. Receipt and processing of the first message causes the training system destination to subsequently receive messages on a second port. The server is configured to receive subsequent messages on the first port intended for the training system destination and to pass modified or unmodified messages to the second port. The controller determines at least one of the flow, format, content, and routing of messages received on the first port and passed to the second port based on a training scenario.

20 Claims, 6 Drawing Sheets

INTEGRATED TRAINING INFOSPHERE

METHOD AND ARCHITECTURE FOR DISTRIBUTED MULTI-ECHELON EXERCISE AND TRAINING SYSTEM AND METHOD OF USING THE SAME

REFERENCE TO PRIOR APPLICATION

The present application relies for priority on a U.S. Provisional Patent Application No. 60/678,666 filed on May 6, 2005, the entire content of which is hereby incorporated herein by reference.

TECHNICAL FIELD

The present invention relates generally to communication systems, and more particularly to an integration apparatus and method for linking diverse training systems into a single training architecture.

RELATED ART

Natural disasters and man-made threats can require the cooperative response of a large number of geographically separated emergency responders operating with a diverse array of equipment, systems, and methods. For example, a natural disaster such as a Tsunami may require the coordination of relief efforts by thousands of volunteers, government agencies, and international organizations in many different countries. Similarly, a terrorist attack may cause mass casualties that would likely overwhelm the capabilities of local and state emergency service organizations and require the assistance of other organizations in order to move and distribute supplies and rescue workers effectively in order to minimize the loss of life. Finally, the threat of a missile attack from a hostile force requires a large number of individuals to respond in concert in order to effectively identify, engage, and neutralize the impending threat. In all of these cases, training of the emergency responders and military forces is key. However, local responders in one region, group, or organization may have vastly different operational mission systems, communications capabilities and protocols than their collaborators in a different region, group, or agency based on the individual system(s) in use by a particular organization, group of individuals, or location.

Systemic incompatibility may minimize the effectiveness of the responsible individuals and staffs, particularly if the people and staff members that need to work together in actual emergencies do not train, exercise or practice together. Thus, there remains a need for an apparatus and method to enable geographically separated personnel operating diverse equipment with incompatible protocols to cooperatively train and exercise to effectively respond in concert to an emergency situation.

SUMMARY

Apparatuses, systems, and methods are disclosed herein that provide the integration of diverse training, education or exercise systems into a single training, education and exercise architecture having a consistent, unified and managed scope of information flow. The core of this method or architecture is denoted as a training, education, and exercise "infosphere."

The general purpose of an infosphere is to provide a set of physically and/or logically centralized information management services that enable communication between information systems that may otherwise be unable to communicate, or that may communicate inefficiently or with difficulty, to more easily and effectively exchange information/data, interact, and provide support for user collaboration. The present method and apparatus uses an infosphere approach to provide a unique capability to integrate separate, and geographically dispersed, training, education and exercise systems that have been procured, developed and/or deployed individually with no requirement to interact. The method significantly extends the general concept of an information service infosphere to add unique capabilities particularly useful and cogent for training, education and exercise activities that span multiple systems, multiple military and civil missions, multiple echelons of hierarchical command or management, and/or multiple geographic locations.

An integrated training infosphere includes a Distributed Multi-Echelon Training System (DMETS) that is incorporated seamlessly into the current training architecture in order to allow for training that more closely approximates real-life situations through the introduction of off-nominal (seemingly unplanned) conditions by the training coordinator to mimic or simulate real-world problems and outages. The DMETS is considered invisible in the sense that only minimal changes are required to existing systems. For example, one change would be in a test system configuration file to modify a receiving or transmitting port. In this manner, the DMETS can capture incoming broadcasts from test scenario injector and then re-broadcast a possibly modified version of the broadcast to an intended receiver which has no knowledge of the "middleman".

More particularly, according to one embodiment of the present invention, an integrated training infosphere is configured to provide integration of a plurality of training systems and to provide at least one of a coordinated, consistent, unified, and managed scope of information flow to the training systems. At least one of the training systems is certified as a stand-alone training system, where the certification of each of the certified training systems is not compromised.

According to another embodiment, a training apparatus includes a server and a controller. The server is configured to send and receive messages on at least one network, to receive messages at a plurality of publisher ports, and to send messages to a plurality of subscriber ports. The controller is configured to operate the server and to send a first message to a training system destination that is initially configured to receive messages on a first port, where receipt and processing of the first message causing the training system destination to subsequently receive messages on a second port. The server is configured to receive subsequent messages on the first port intended for the training system destination and to pass modified or unmodified messages to the training system destination at the second port. The controller determines at least one of the flow, format, content, and routing of messages received on the first port and passed to the second port based on a training scenario.

According to another embodiment of the present invention, a method of integrating diverse training systems includes the operations of creating a communication channel between a predetermined portion of a plurality of publisher ports and a predetermined portion of a plurality of subscriber ports in a domain controller, classifying each of the plurality of ports into at least one of a publisher port, a subscriber port, a pass-through publisher port, and a pass-through subscriber port. The method further comprising routing messages within the domain controller between the plurality ports based on a training scenario.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A basic military tenet is to "train as you fight." For example, in the event of an enemy ballistic missile launch against the United States, several distinct military and homeland security missions or activities would typically be performed or initiated including a Integrated Tactical Warning/Attack Assessment (ITW/AA, also known as Missile Warning) mission, a Missile Defense (MD) mission, an Attack Operations (AO) mission, a Passive Infrastructure and Population Protection (PIPP) mission, and a Consequence Management (CM) mission. Different organizations may be responsible for these various missions and they utilize separately procured and operated mission systems (often multiple systems within a single organization). The first three missions listed above, ITW/AA, MD, and AO, are military missions of the DoD; while other Government Agencies lead the latter PIPP and CM missions with military support as directed. Given these diverse sets of roles, responsibilities, authority and capabilities, a critical need of the operators is to be able to train and practice in as realistic an environment as possible.

For the real-world operational mission systems, much of the coordination and interoperability is via voice communications and messaging, but the various mission systems may be depicting the same situation and events in different display formats, with different data from different sources and sensors. This creates the problem of ambiguity and potential confusion among the various collaborating operators and mission crews. Although each mission system is normally procured with a system training capability, these "stand-alone" trainers are neither interfaced nor used in the same collaborative environment as the operational systems would be. There is thus a critical need to be able to train together using the same systems which would be needed in response to an emergency situation.

As described, an infosphere approach is used to tie existing stand-alone training systems together without modification of any of them. The infosphere provides data/information translation and communications message format and protocol conversion between the systems without requiring any of the systems to change their previously defined interfaces, including message formats, protocols and timing. In addition, the infosphere provides the point of injection and control of a single training scenario for all participating training systems. It also provides a training manager with control over the set of participants, an ability to inject "off-nominals" the ability to label and isolate data, as well as the ability to record and playback training scenario events and responses. "Off-nominals" may be injected conditions that simulate failures, errors or problems in the real operational systems. In other training approaches, off-nominal conditions may be scripted (eg, as outages and failures in systems, subsystems or communications, as unusual weather conditions, etc.) into the training scenario. The occurrence of the off-nominals in the scripts can be "learned" or anticipated by trainees when the scenario is repeated, so that the training could lose effectiveness. The present method allows an instructor to create off-nominals in real time, independent of the (pre)scripted training scenario. The off-nominals thus retain their effectiveness in training the crew and individual trainee responses to them. The Infosphere and training management elements also provide other instructor, observer, and student services and functions.

Even though diverse training systems are integrated by the infosphere, each individual training system can still preserve its certification by command and training authorities for training individual operators and/or crews to a required proficiency for the corresponding individual operational system and mission(s). Stated differently, the infosphere behaves as an information server or broker among the unmodified pre-existing training systems while providing other capabilities such as scenario injection, recording and playback for subsequent analysis. The infosphere provides both data and format translation as well as flow control over individual information flows. It also provides recording and labeling capability, as well as other functions. The Resource Manager provides Trainer control over participation in the training session, and other instruction capabilities.

Figure 1:
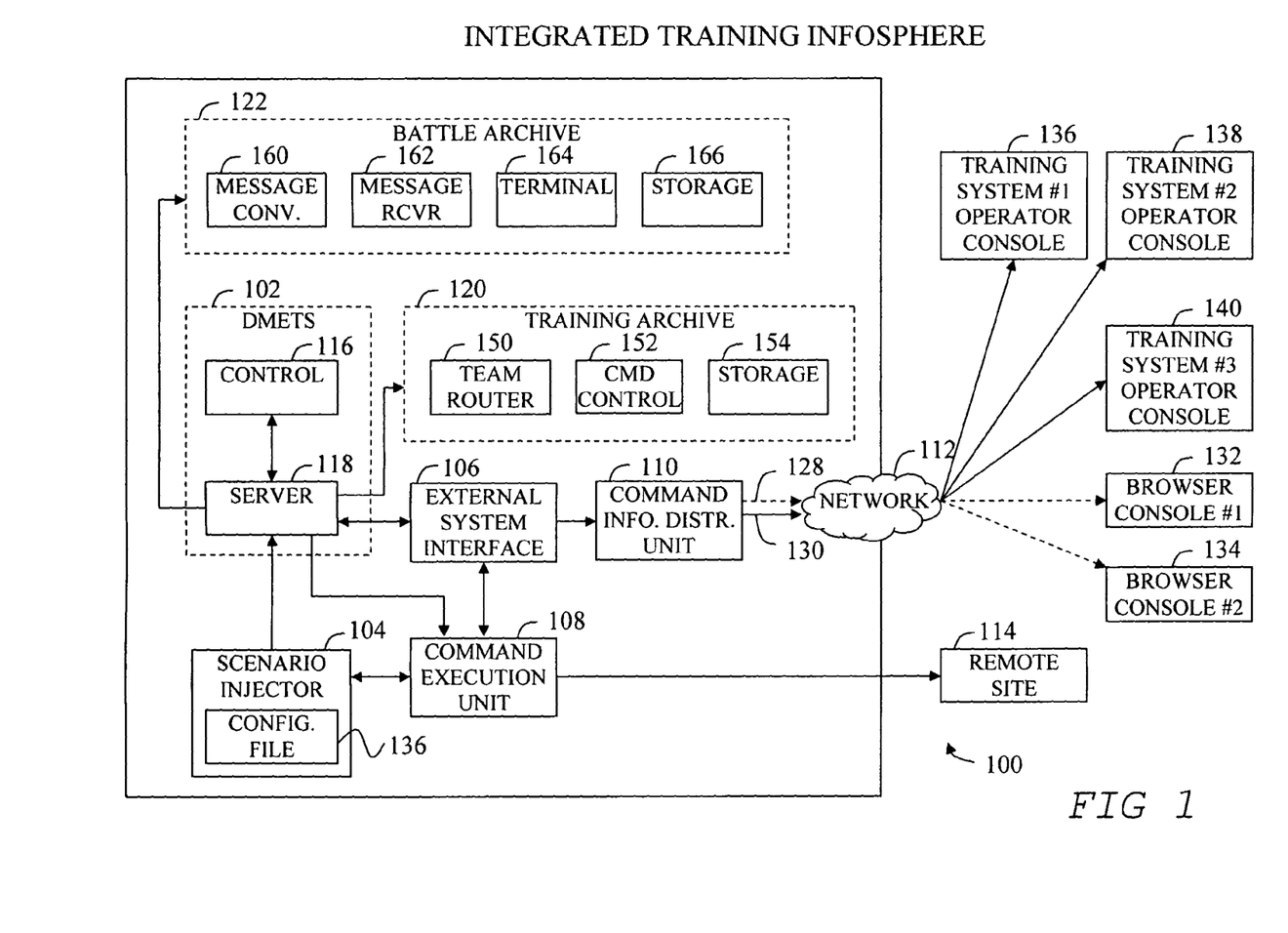
FIG. 1 shows a block diagram view of an integrated training infosphere, in accordance with an embodiment of the present invention.

In reference to FIG. 1, an integrated training infosphere 100 includes a Distributed Multi-Echelon Training System apparatus (DMETS) 102 that controls the flow, format, content, and routing of information between a scenario injector 104 of a scripted training, education or exercise scenario and at least one receiver of that information. An existing stand-alone training system(s) or scenario injector 104 may or may not have a separate External System Interface (ESI) 106. Scenario injector 104 may inject not only threat objects or events that must be responded to by the trainees in the training session, but also may model the behaviors and communications of external systems that are not are part of present group of systems for which training is being performed in the present scenario. In this manner, a virtual external system may be instantiated depending on the needs of the training scenario.

The collection of simulated threat objects, events, enemy systems and geospatial environment; the simulated, emulated or replicated operational systems and communications networks (which the trainees operate and which reproduce for education, training and/or exercise the operational Defense Network); and the training and exercise infrastructure are collectively termed the Distributed Multi-echelon Exercise and Training architecture. A defense network must include communications, command, and control ($C^3$) systems and structures; sensors and other information sources; platforms; and weapon or other response systems necessary to detect an actual or impending attack from a hostile force, determine an appropriate course of action or response, coordinate that response to the attack, and execute that response and monitor its progress. The response can include deployment, activation and operations of relevant weapon systems, platforms, sensors, communications, personnel and other assigned resources, as well as requests for support and coordination with other organizations, military commands, agencies or allies.

Scenario injector 104, or Test Exerciser (TEx) 104, communicates (possibly via an ESI unit 106 or directly) with command execution unit 108 and a command information distribution unit 110. Command execution unit 108 issues operational commands to deploy weapon systems and personnel in response to the scenario defined by scenario injector 104. Command information distribution unit 110 disseminates exercise information through a network 112 to various operator consoles in order to communicate the status of the test exercise. In one embodiment, command execution unit 108 can be a fire control (FC) unit for targeting and launching weapons against hostile forces and facilities, command information distribution unit 110 can be a battle management command, control, and communications unit, and network 112 can be a secure communications network such as the Secret Internet Protocol Router Network (SIPRNet). The SIPRNet is a worldwide SECRET level packet switch network that uses high-speed internet protocol routers and high-capacity defense information systems networks. Command execution unit 108 issues operational commands to one or more remote sites 114. In one embodiment, remote site 114 can be a training site that includes a simulator for launching weapons.

DMETS 102 includes a DMETS control unit 116 and a DMETS server unit 118. DMETS control unit 116 can include an interface for a training manager (TM) such as an operator console for providing injection and control of commands to implement a training scenario. DMETS server unit 118 receives the commands and manages the information flow between TEx 104 and ESI 106. DMETS control unit 116 can include a man-machine-interface (MMI) for a training manager that allows the introduction of off-nominal conditions during the exercise. In this manner, the training exercise can more closely approximate a real-life situation and the training system can more accurately assess the ability of trainees to respond to unexpected mission scenarios.

In some cases, it may be desirable to record and playback a particular training scenario. To accomplish this, DMETS server unit 118 sends messages to a training archive 120 and a battle archive 122. Training archive 120 can include a separate training system that records the training scenario commands and results in order to record the success or failure of various aspects of the training scenario. Similarly, battle archive 122 can record the initially predicted versus actual battle data in order to assess the accuracy of battle predictions including launch point, impact point, and trajectory information.

Command information distribution unit 110 distributes two levels of information through network 112; summary information 128 and detailed information 130. Summary information 128 is typically distributed to low capacity web-browser applications (132, and 134) which can be running on a relatively inexpensive monitoring terminal. On the other hand, detailed information 130 is typically distributed to higher capacity operator consoles (136, 138, and 140) which can be running on sophisticated training or interactive operational systems. In one embodiment, higher capacity operator consoles (136, 138, and 140) integrated in the infosphere 100 can comprise diverse, stand-alone training systems, where at least one of the training systems is certified for training personnel to a required proficiency. In many cases, a certification may be invalidated by incorporation of the certified training system into another system. However, integration of the diverse training systems (136, 138, 140) within infosphere 100 permits the training system to operate without knowledge of a "middleman", hence the certification is preserved, or not compromised by the integration within infosphere 100.

Mission or training information flowing into training archive 120 from DMETS server 118 passes through a team router 150 to reach a designated command and control unit 152. In one embodiment, team router 150 can designate a particular team of personnel, equipment, or a particular area of battle responsibility, and may be designated as Alpha, Bravo, Delta, etc. Further, command and control unit 152 can include one or more user interface terminals related to a Command Center Processing and Display System Replacement (CCPDS-R) project for display and monitoring by training participants. In this case, CCPDS-R provides near-real-time processing, display and distribution of ballistic missile (ITW/AA) information, including nuclear detonation reports, to the National Command Authorities and forward users. All mission information flowing into training archive 120 is stored in a mass data storage unit 154 in order to record the training session for later playback and analysis.

Battle information from DMETS server 118 flowing into battle archive 122 can be converted into message form by a message converter 160, such as a MAKEMSG process, and passed to a battle message receiver 162 and then viewed using a terminal 164. In one embodiment, both receiver 162 and terminal 164 can conform to the specifications of the Command Center Processing Display System Modernization (PDS-M) project. Some portion of the battle information flowing into battle archive 122 is stored in a mass data storage unit 166 in order to record the training session for later playback and analysis. Scenario injector 104 may include a configuration file 136 that provides a mapping of the routing from the plurality of publisher ports to the plurality of subscriber ports. A port may be considered a communication channel or conduit through which information is passed. A system listening to a particular port is configured to receive information from that port. More than one port may be used for a particular device or system to support a plurality of communication channels.

Figure 2:
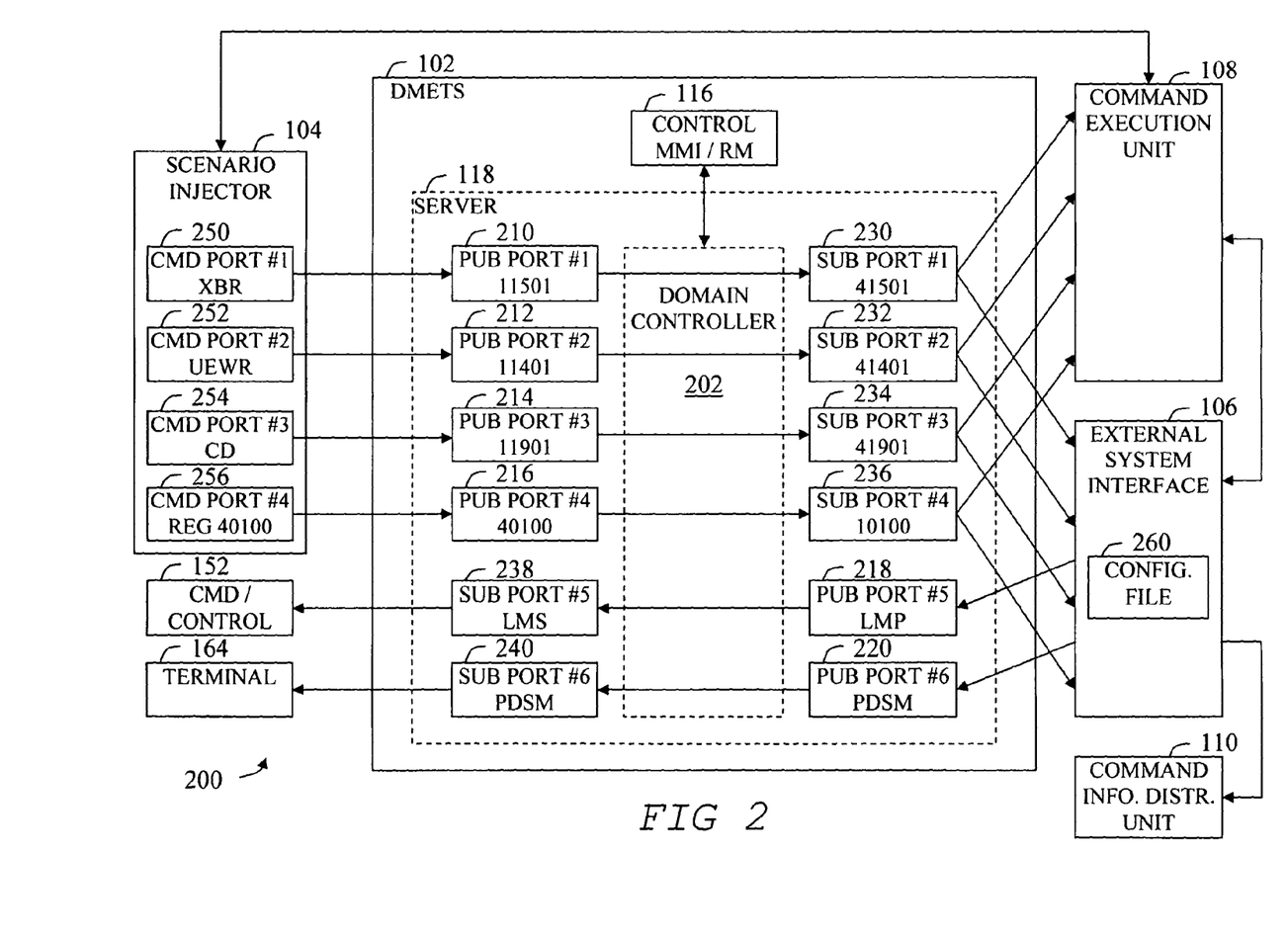
FIG. 2 shows another block diagram view of the integrated training infosphere, in accordance with an embodiment of the present invention.

In reference to FIG. 2, DMETS server unit 118 includes a domain controller 202 that receives incoming messages received from a plurality of publisher ports (210, 212, 214, 216, 218, and 220) and transmits outgoing messages to a plurality of subscriber ports (230, 232, 234, 236, 238, and 240). Alternatively, publisher ports may be designated publishing ports or nodes, while subscriber ports may be designated subscribing ports or nodes. Publisher nodes may be considered as data sources, while subscriber nodes may be considered as data sinks. TEx 104 outputs commands through a plurality of command ports (250, 252, 254, and 256). Signals from these command ports are applied to publisher ports (210, 212, 214, and 216). In one embodiment, TEx 104 can include message outputs from various sensor systems where message port 250 can correspond to information from an X-Band Radar (XBR) system, message port 252 can correspond to information from an Upgraded Early Warning Radar (UEWR) system, and message port 254 can correspond to information from a long range early warning system compliant with the Cobra Dane (CD) system. Message port 256 can correspond to a command interface having a particular port identifier. Server 118 may send a configuration change message to a training system destination initially configured to receive messages on an originally specified first port, where receipt and processing of the configuration change message causes the training system destination to subsequently receive messages on a newly defined second port.

In one example, message port can correspond to a particular register, say REG 40100, in a message passing scheme. Each of the message ports in TEx 104 maps to an associated publishing port in DMETS server 118. Messages from subscriber ports (238 and 240) are applied to command and control unit 152 and terminal 164, respectively. In this disclosure, not all intermediate points of message travel are discussed, but rather the source and destination nodes are described.

Domain controller 202 receives the messages on the publishing ports and re-routes, or re-maps, these messages to particular subscriber ports. This remapping can include changing a single digit in a user datagram protocol (UDP) address, such as an internet protocol (IP) address. For example, if TEx port 252 outputs message data intended for address port 11401, the complete network address for the intended port can be 238.192.14.141:11401. DMETS server 118 can receive messages from TEx port 252 on publisher port 212 that is mapped to the port 238.192.14.141:11401 and broadcast a related message on subscriber port 232 that maps all message traffic to a different network address 238.192.14.141:41401. Alternatively, the port number may have a binary representation where publisher port 212 port address number and subscriber port 232 port address number differing by one binary digit.

In the same manner, message traffic received on publishing ports (210, 212, 214, and 216) can be re-mapped to subscribing ports (230, 232, 234, and 236). As shown, only DMETS 102 is receiving messages from (listening to) TEx 104, while all the other data sinks are receiving messages from the re-routed subscriber ports. Subscribing ports can broadcast the remapped messages to ESI 106 and command execution unit 108. Similarly, ESI 106 can broadcast messages to publishing ports (218, and 220) which domain controller 202 re-maps to subscriber ports (238, and 240) respectively, so that command and control unit 152 receives messages only from the re-mapped subscriber port 238 and terminal 164 receives messages only from the re-mapped subscriber port 240.

Publishing and subscribing ports can be implemented in at least two variations. A pass-through publishing port is one which merely re-maps the broadcasting subscriber port without altering the message data, while a non-pass-through publishing port can both alter the message data as well as change the broadcasting subscriber port. ESI 106 may include a configuration file 260 that provides a mapping of the publishing and subscriber ports.

Figure 3:
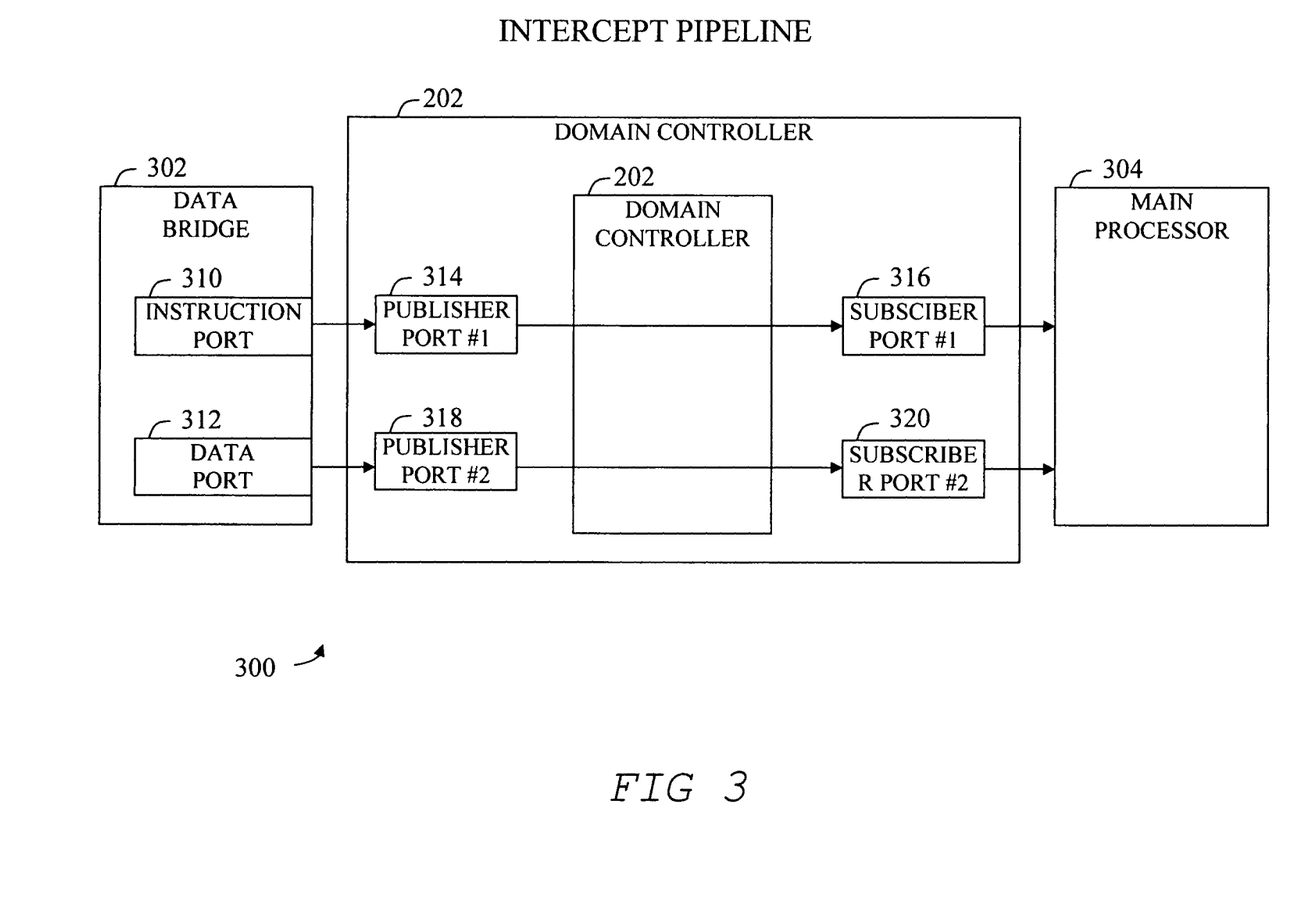
FIG. 3 shows a portion of an intercept pipeline, in accordance with an embodiment of the present invention.

FIG. 3 shows a portion of an intercept pipeline 300 with domain controller 202 interposed between a data bridge 302 and a processor 304. Data bridge 302 can include a plurality of message ports of at least two types (310 and 312) where message port 310 broadcasts instruction information and message port 312 broadcasts data information. Instruction information from port 310 can be applied to publishing port 314 and re-mapped to subscribing port 316 where both the content and port address may be altered. Data information from port 312 can be applied to a pass-through publishing port 318 and re-mapped to pass-through subscribing port 320 where only the port addresses are altered while the data content of the data message is not altered. As described, a training manager (or training coordinator) can create and control communication channels between various, diverse training systems and environments so that these diverse training systems are incorporated into a unified infosphere.

As disclosed, an integrated training architecture can include one or more of the following capabilities and or benefits in accordance with one or more embodiments of the present invention:

1. Input an identical training scenario into all the training systems, with synchronized timing of events.
2. Provide as realistic a training environment as possible where personnel are operating substantially similar software, workstations, procedures, databases and communications as the real-world mission systems.
3. Clearly label or discriminate the training environment, displays and messages as "NOT Live", TRAINING, or some other meaningful description to distinguish an actual live mission from a training mission.
4. Isolate training and exercise messages and data from the real-world mission systems.
5. Provide flexibility to train different sets of participating individuals, crews, and groups at different times utilizing reconfigurability.
6. Provide capability for a training coordinator or instructor to inject "off-nominal" conditions into the scenario to mimic real-world problems and outages.
7. Provide a capability to record trainee actions (both verbal communications and interactions with the system[s]) for trainee performance analysis and feedback.
8. Use, but do not require modification to, any existing certified stand-alone training systems.

Figure 4:
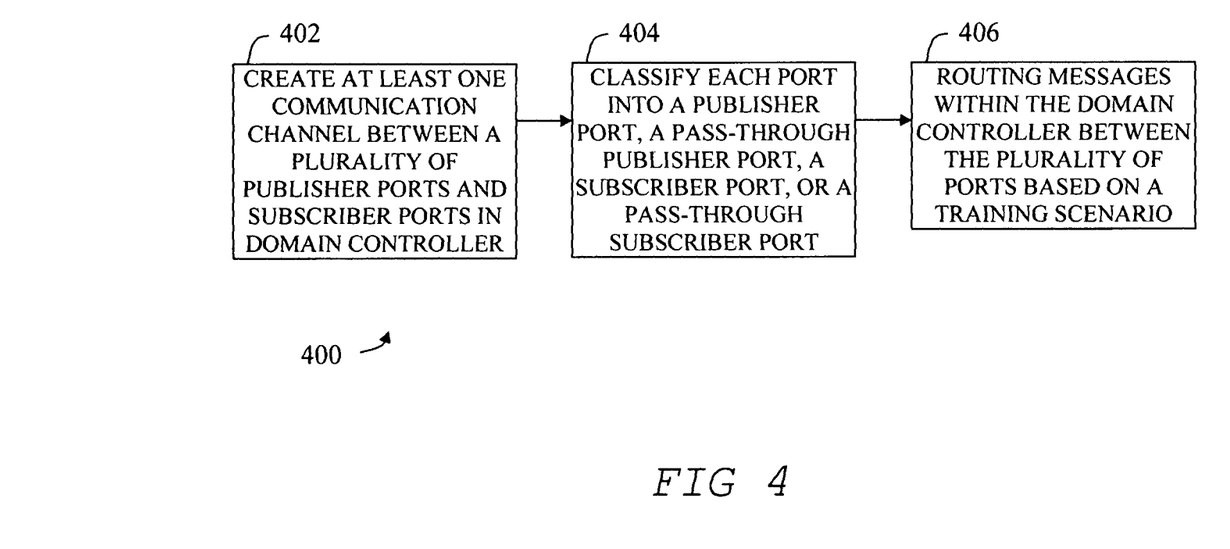
FIG. 4 shows an exemplary flow illustrating a method of integrating diverse training systems, in accordance with an embodiment of the present invention.

FIG. 4 shows an exemplary flow 400 illustrating a method of integrating diverse training systems, in accordance with an embodiment of the present invention. Flow 400 includes the operations of creating at least one communication channel between a predetermined portion of a plurality of publisher ports and a predetermined portion of a plurality of subscriber ports in a domain controller in operation 402, classifying each of the plurality of ports into at least one of a publisher port, a subscriber port, a pass-through publisher port, and a pass-through subscriber port in operation 404, and routing messages within the domain controller between the plurality ports on the created communication channels based on a training scenario in operation 406. The created communication channels are based on the classification of each port, conforming to the training scenario. The pass-through publishers may only modify a message by prepending an extensible Markup Language (XML) header and by appending an XML footer.

Figure 5:
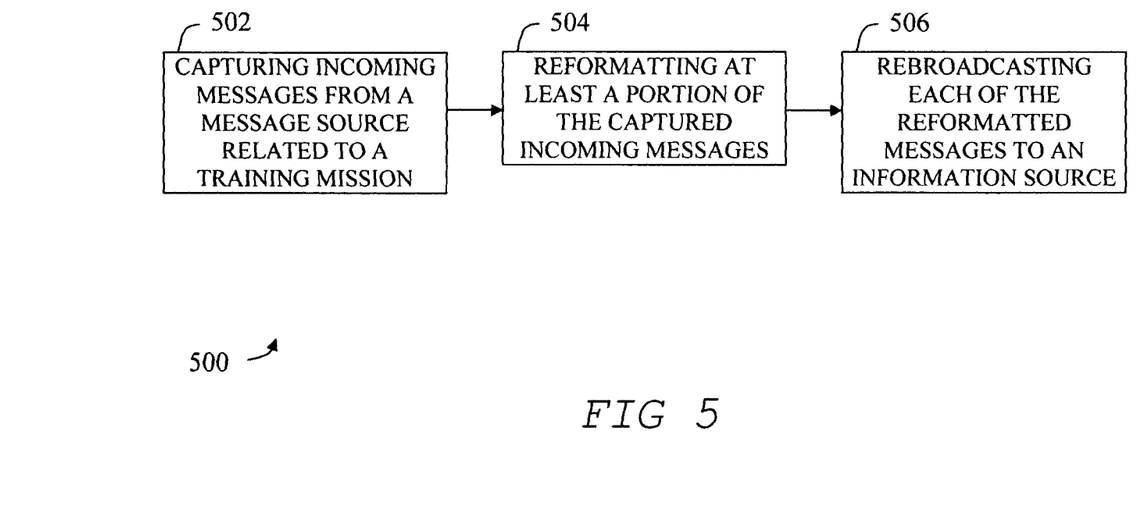
FIG. 5 shows an exemplary flow illustrating the operation of routing messages in the method of integrating diverse training systems, in accordance with an embodiment of the present invention.

FIG. 5 shows an exemplary flow 500 illustrating the operation of routing messages in the method of integrating diverse training systems, in accordance with an embodiment of the present invention. Flow 500 includes the operations of capturing incoming messages from a message source where the incoming messages are related to a training mission in operation 502, reformatting at least a portion of the captured incoming messages to produce a reformatted message in operation 504, and re-broadcasting each of the reformatted messages to an information destination in operation 506. The information destinations are unable to detect the rebroadcasted messages have been modified. In this manner, the integration of the diverse training systems is transparent.

Figure 6:
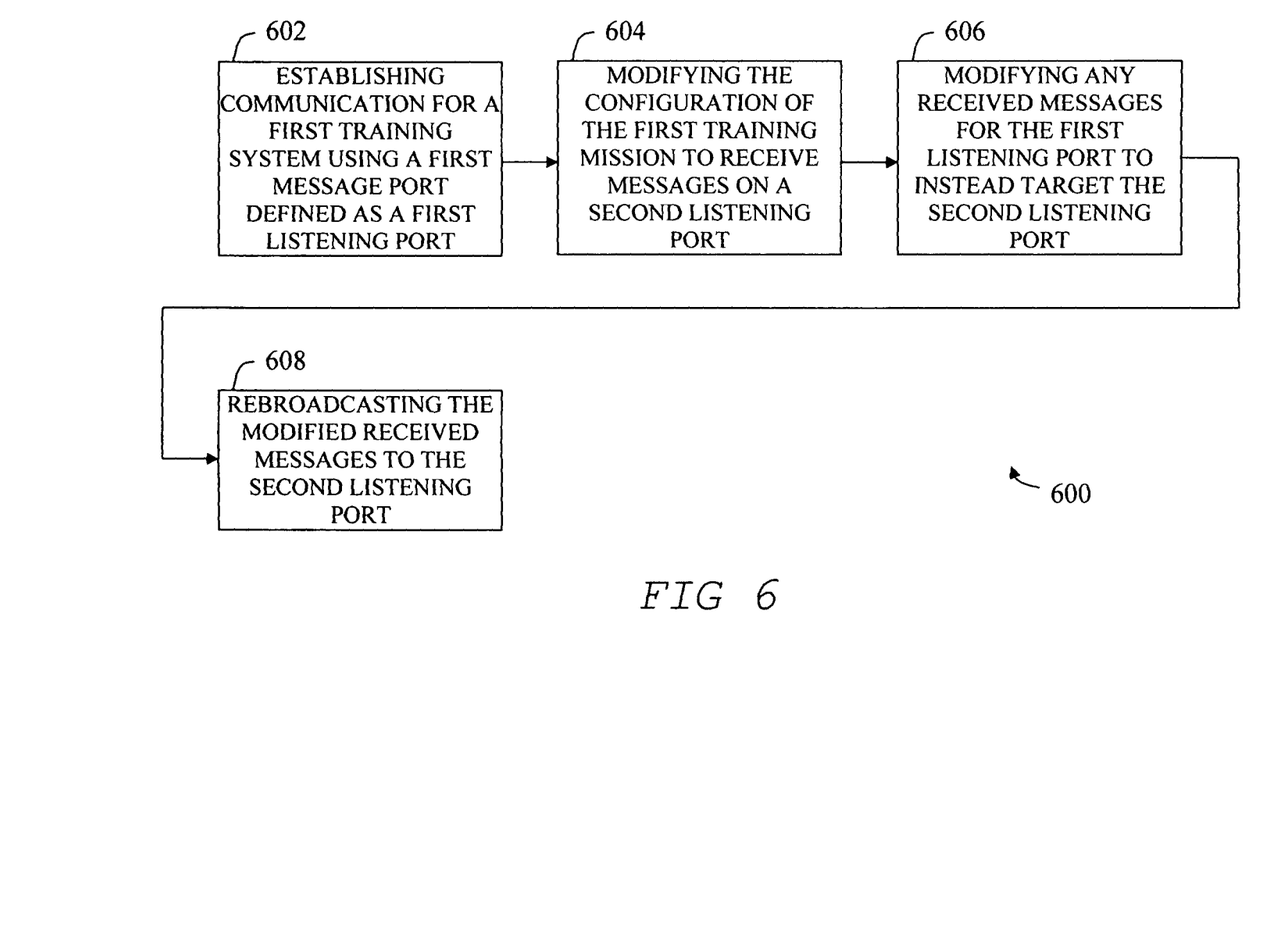
FIG. 6 shows an exemplary flow illustrating the operation of reformatting within the operation of routing messages, in accordance with an embodiment of the present invention.

FIG. 6 shows an exemplary flow 600 illustrating the operation of reformatting within the operation of routing messages, in accordance with an embodiment of the present invention. Flow 600 includes the operations of establishing communication for a first training system using a first port where the first training system receives messages on a first listening port in operation 602, modifying the configuration of the first training system to receive messages on a second listening port in operation 604, modifying any received messages for the first listening port to target the second listening port in operation 606, and broadcasting the modified received messages to the second listening port in operation 608.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A training apparatus, comprising:
a server configured to send and receive messages on at least one network on a first port intended for a training system destination and to pass one of modified messages and unmodified messages to the training system at a second port; and
a controller configured to:
create at least one communication channel between a predetermined portion of a plurality of publisher ports and a predetermined portion of a plurality of subscriber ports in a domain controller;
classify each of the plurality of ports including the first port and the second port into at least one of a publisher port, a subscriber port, a pass-through publisher port, and a pass-through subscriber port; and
operate the server and to determine and selectively modify at any time during the running of a given training scenario at least one of the flow, format, content, and routing of selected ones of the messages received on the first port and passed to the second port based on the training scenario,
wherein the modifying of the training scenario content includes:
receiving trainer instructions from a user for creating off-nominals during a running of the training scenario;
creating, during the running of the training scenario, the off-nominals based on the trainer instructions that are independent of pre-scripted training scenarios and independent of predetermined operations of the training scenario to prevent the off-nominals from being learned or anticipated by trainees;
selectively injecting the off-nominals, including failures, errors or problems in a real operation system, into the scenario so as to mimic real-world problems and outages by selectively modifying at least one of the flow, format, content, and routing of the selected one of the messages received on the first port and passed to the second port;
isolating training and exercise messages and data of actual live missions from those of training missions; and
recording and playing back of training scenario events and responses.

2. The apparatus of claim 1, wherein each port has a port number, the first port number and the second port number differing by one digit.

3. The apparatus of claim 2, wherein the port number has a binary representation, the first port number and the second port number differing by one binary digit.

4. The apparatus of claim 1, further comprising:
a scenario injector configured to provide the training scenario.

5. The apparatus of claim 4, wherein the training scenario corresponds to a training mission that is distinguished from an actual live mission.

6. The apparatus of claim 4, wherein the scenario injector includes a configuration file that provides at least one of flow, format, content, and routing information from the plurality of publisher ports to the plurality of subscriber ports.

7. The apparatus of claim 4, wherein the scenario injector may introduce a formatted version of the training scenario to two or more diverse training systems, the formatted training scenario versions having a synchronized timing of events, at least one of the interfaces, message formats, protocols, and timing for the diverse training systems being unmodified.

8. The apparatus of claim 4, further comprising an external system interface configured to provide a training system response to the training mission.

9. The apparatus of claim 1, further comprising an archive configured to store and retrieve network messages corresponding to at least one of actions and responses from at least one of a plurality training systems.

10. The apparatus of claim 1, wherein the at least one network conforms to at least one of a User Datagram Protocol (UDP) and a Transmission Control Protocol/Internet Protocol (TCP/IP).

11. The apparatus of claim 6, further comprising a domain controller configured to establish a communication channel configured to route messages between the publisher ports and the subscriber ports based on a routing table describing a current routing configuration.

12. The apparatus of claim 11, wherein the domain controller comprises an intercept pipeline.

13. The apparatus of claim 6,
wherein one or more of the publisher ports are classified as the pass-through publisher ports,
wherein one or more of the subscriber ports are classified as the pass-through subscriber ports,
wherein messages received via the pass-through publisher ports are remapped for the pass-through subscriber ports without modifying message data, and
wherein messages received via non-pass-through publisher ports are remapped for non-pass-through subscriber ports with modifications to message data.

14. The apparatus of claim 1, wherein the pass-through publishers remaps the messages by prepending an eXtensible Markup Language (XML) header and by appending an XML footer of each message.

15. The apparatus of claim 1, wherein the controller is further configured to route messages within the domain controller between the plurality ports based on a training scenario.

16. A method of integrating diverse training systems, the method comprising:
creating at least one communication channel between a predetermined portion of a plurality of publisher ports and a predetermined portion of a plurality of subscriber ports in a domain controller;

classifying each of the plurality of ports into at least one of a publisher port, a subscriber port, a pass-through publisher port, and a pass-through subscriber port; and routing messages within the domain controller between the plurality ports based on the created communication channels based on the classification of each port and based on a training scenario;

wherein the training scenario includes:

receiving trainer instructions from a user for creating off-nominals during a running of the training scenario;

creating, during the running of the training scenario, the off-nominals based on the trainer instructions that are independent of a pre-scripted training scenario and independent of predetermined operations of the training scenario to prevent the off-nominals from being learned or anticipated by trainees;

selectively injecting the off-nominals, including failures, errors or problems in a real operation system, into the scenario to mimic real-world problems and outages by selectively modifying at least one of the flow, format, content, and routing of selected ones of messages received on the publisher ports and passed to the subscriber ports; and isolating training and exercise messages and data of actual live missions from those of training missions; and recording and playing back of training scenario events and responses.

17. The method of claim 16, wherein the pass-through publishers only modify a message by prepending an eXtensible Markup Language (XML) header and by appending an XML footer.

18. The method of claim 16, further comprising a reformatting operation, including:

establishing communication for a first training system using a first port, the first training system receiving messages on a first listening port;

modifying the configuration of the first training system to receive messages on a second listening port;

modifying any received messages for the first listening port to target the second listening port; and, broadcasting the modified received messages to the second listening port.

19. The method of claim 16, wherein the routing of messages comprises:

capturing incoming messages from a message source, the incoming messages being related to a training mission;

modifying selected ones of the captured incoming messages during the running of the training mission to produce modified messages; and, re-broadcasting the modified messages to information destinations, the information destinations being unable to detect that the re-broadcasted messages have been modified.

20. The method of claim 16, wherein the modifying includes:

substituting or replacing a message with another selected from a menu or generated in real time;

completely deleting a message;

changing a characteristic or the entire character of a message;

changing the point within the mission at which a message occurs; and, changing which participants in the mission receive or do not receive a message.

* * * * *